United States Patent [19]

Daniels et al.

[11] Patent Number: 5,003,032

[45] Date of Patent: Mar. 26, 1991

[54] AROMATIC POLYMERS

[75] Inventors: James A. Daniels, Yarm; Ian R. Stephenson, Thornaby, both of England

[73] Assignee: Imperial Chemical Industries PLC, London, England

[21] Appl. No.: 485,652

[22] Filed: Feb. 27, 1990

[30] Foreign Application Priority Data

Feb. 27, 1989 [GB] United Kingdom ................. 8904410

[51] Int. Cl.$^5$ ............................................. C08G 61/12
[52] U.S. Cl. .................................... 528/190; 528/193; 528/206
[58] Field of Search ......................... 528/190, 193, 206

[56] References Cited

U.S. PATENT DOCUMENTS

| | | | |
|---|---|---|---|
| 3,953,400 | 4/1976 | Dahl | 528/206 X |
| 4,229,564 | 10/1980 | Dahl | 528/206 X |
| 4,396,755 | 8/1983 | Rose | 528/190 X |
| 4,398,020 | 8/1983 | Rose | 528/206 X |
| 4,645,819 | 2/1987 | Sterzel | 528/190 X |
| 4,820,794 | 4/1989 | Darnell et al. | 528/206 X |
| 4,861,856 | 8/1989 | Darnell et al. | 528/190 X |

*Primary Examiner*—Earl Nielsen
*Attorney, Agent, or Firm*—Cushman, Darby & Cushman

[57] ABSTRACT

The invention relates to novel polyarylethers which are essentially ketonic and which are based on the dibenzofuran molecule. Such polymers are, surprisingly, amorphous, have high Tg's eg>200° C., and have surprisingly high solvent resistance.

8 Claims, No Drawings

AROMATIC POLYMERS

This invention relates to aromatic polymers.

Aromatic polyethers are known, useful polymers which have been produced by a variety of methods. The methods are usually based on two reaction types, namely electrophilic aromatic substitution (e.g. the polycondensation of acid chlorides or carboxylic and-/or sulphonic acids with aryl ethers to produce ketone or sulphone linkages) and nucleophilic aromatic substitution (e.g. the polycondensation of activated aryl fluorides with phenoxides to produce ether linkages). U.S. Pat. No. 3,441,538 discloses an electrophilic synthesis of inter alia a variety of ketone and/or sulphone polymers represented by a number of generic formulae. Additionally, examples of such methods as applied to ketone polymers have recently been reviewed by M J Mullins and E P Woo, J Macromolecular Science - Rev. Macromol Chem Phys, C27 (2), 313, 1987.

Polyaryletherketones are particularly useful since they are usually crystalline, have relative high glass transition (Tg's) and melting temperatures (Tm's) and exhibit a variety of useful properties such as excellent electrical insulating and mechanical properties at high temperatures and high strength, toughness and resistance to fire and chemicals. Two particular polymers, i.e. polyetherketone (PEK), Tg=156° C., Tm=365° C., having the repeating unit:

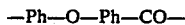

wherein Ph is 1,4-phenylene and polyetheretherketone (PEEK). Tg=144° C. Tm=334° C. having the repeat unit:

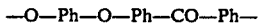

have been commercially exploited.

Whilst such polymers are excellent materials, there are applications for polymer which require even higher Tg's. Although polyarylethersulphones have high Tg's, they are not acceptable for many applications owing to their amorphous nature which results in a lack of solvent resistance. Such amorphous polymers would otherwise be very useful owing to their easier processing and strength retention at higher temperatures than the crystalline or semi-crystalline polymers.

The Applicants have found surprisingly that polyarylethers which essentially contain ketone linkages and which contain a repeating unit of formula I:

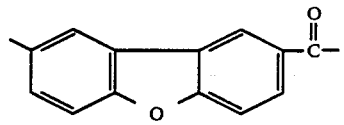

exhibit enhanced Tg's compared to the Tg's of PEK and PEEK but are amorphous and yet retain significant solvent resistance as compared to amorphous polymers such as polyarylethersulphones.

Thus, according to the present invention, an amorphous aromatic polymer comprises a repeating unit of formula I:

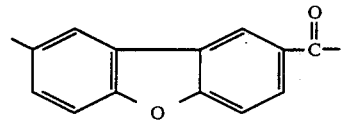

either alone or together with other divalent aromatic repeating units, aromatic moieties which comprise said repeating units in the polymer being connected to one another by linkages selected from a direct link, —O—, —S—, —CO—, —SO$_2$— or —CR$_2$— where R is hydrogen, C$_1$ to C$_4$ alkyl, phenyl or the two groups R, which otherwise may be the same or different, are joined externally to form a cycloaliphatic ring, provided that, when present, the proportion of repeating units containing —SO$_2$— linkages is not more than 20 mole % of the total number of repeating units and that, when present, said aromatic moieties of said other repeating units which are linked to adjacent aromatic moieties by —CO— linkages are not solely comprised by 1,3-phenylene.

Polymers according to the invention are amorphous in contrast to other polyaryletherketones which are crystalline or semi-crystalline.

Although amorphous polymers are usually soluble in a number of solvents, surprisingly the amorphous polymers according to the invention exhibit good solvent resistance. In particular, the polymer exhibits a weight loss of not more than 20%, preferably not more than 10%, when refluxed in dichloromethane for 30 minutes.

Polymers according to the invention also exhibit enhanced Tg's compared to the Tg's of PEK and PEEK. Preferred polymers exhibit Tg's of at least 200° C. and more particularly at least 250° C.

Preferably, polymers according to the invention have an inherent viscosity (measured using a 0.1% solution of polymer in 98% H$_2$SO$_4$ at 25° C.) of at least 0.2 dlg$^{-1}$ and more particularly of at least 0.3 dlg$^{-1}$.

When other repeating units are present, the mole ratio of repeating unit I to said other units is preferably in the range 10:90 to 90:10, more particularly in the range 40:60 to 90:10. Preferred polymers according to the invention contain at least 50 mole % of repeating unit I. Examples of said other repeating units are:

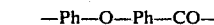
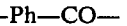
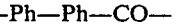
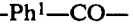

wherein Ph$^1$ is 1,3-phenylene. When the latter repeat unit is present, it preferably comprises not more than 95 mole %, more particularly not more than 75 mole % of said other repeating units.

The other repeating units may include units containing sulphone linkages, but the proportion of such sulphone linkage containing units, as specified above is not more than 20 mole %, and is preferably not more than 10 mole %.

Polymers according to the invention are thus particularly useful for applications which require resistance to solvents and strength retention at high temperatures.

Polymers in accordance with the invention can be melt processed into shaped articles such as films, insulating coatings on electrical conductors and matrices for composites. They can be used in applications for which polyaryletherketones and/or polyarylethersulphones have been proposed previously. In particular they may be used for those applications which require a combination of one or more of good electrical insulating properties, good resistance to a wide range of chemicals, retention of mechanical properties up to high temperature, good resistance to burning and the emission of low proportions of toxic fumes and with low smoke density on burning. Films whether undrawn, uniaxially-drawn or biaxially-drawn are especially useful when made of these polymers.

Whilst for many applications the polymers of the invention may be used with few if any additives, other than stabilisers, additives may be incorporated for example inorganic and organic fibrous fillers such as of glass, carbon or poly(paraphenylene terephthalamide); organic fillers such as polysulphones, polyketones, polyimides, polyesters and polytetrafluoroethylene at various levels of compatibility; and inorganic fillers such as graphite, boron nitride, mica, talc and vermiculite; nucleating agents: and stabilisers such as phosphates and combinations thereof.

Typically the total content of additives is 0.1 to 80%, especially at most 70% by weight of the total composition. The composition can contain for example 5 to 30% by weight of boron nitride; or at least 20% by weight of short glass or carbon fibre; or 50 to 70% especially about 60%, by volume of continuous glass or carbon fibre; or a mixture of a fluorine-containing polymer, graphite and an organic or inorganic fibrous filler and the total proportion of these additives is preferably 20 to 50% by weight of the total composition.

The composition may be made by mixing the polymer with the additives for example by particle or melt blending. More specifically the polymeric material, in the form of dry powder or granules, can be mixed with the additives using a technique such as tumble blending or high speed mixing. The blend thus obtained may be extruded into a lace which is chopped to give granules. The granules can be subjected to a forming operation, for example injection moulding or extrusion, to give a shaped article.

Alternatively the composition may be film, foil, powder or granules of the polymer with or without particulate additives, laminated with a fibrous filler in the form of mats or cloths.

Alternatively a composition containing fibrous filler may be obtained by passing essentially continuous fibre, for example glass or carbon fibre, through molten polymer or a mixture containing it in a dissolved or finely dispersed state. The product obtained is a fibre coated with polymer and may be used alone, or together with other materials, for example a further quantity of the polymer, to form a shaped article. The production of compositions by this technique is described in more detail in EP-A 56703, 102158 an 102159.

Also, according to the present invention, a process for forming an amorphous aromatic polymer according to the invention comprises polycondensing at least one aromatic monomer susceptible to lo electrophilic substitution in at least two positions and including an aromatic moiety of formula II:

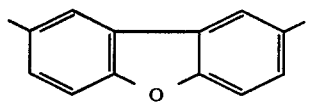

in the presence of an acid capable of activating the condensation reaction.

Preferably, the aromatic monomer comprises a compound of formula III:

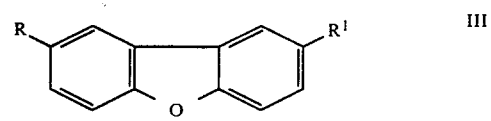

wherein R and $R^1$ are independently —H or —COX where X is —OH or halide, preferably chloride.

In one form of the invention, an aromatic compound of formula III in which R and $R^1$ are H is polycondensed with an aromatic compound of formula III in which R and $R^1$ are —COX.

In another form of the invention, an aromatic compound of formula III in which R is —H and $R^1$ is —COX is polycondensed with itself.

Alternatively, mixtures of such aromatic compounds of formula III can simultaneously or sequentially take part in the polycondensation reaction.

In yet another form of the invention an aromatic compound of formula III in which R and $R^1$ are H is polycondensed with carbon dioxide in solution or, alternatively, reacted with phosgene.

Other aromatic compounds can be included in the polycondensation reaction to produce copolymers. Examples of such compounds include terephthaloyl chloride, isophthaloyl chloride and diphenyl ether.

If required, a small proportion (e.g. about 0.1%) of the aromatic monomers used in the invention can comprise a monomer which will end cap the polymer chain, e.g. a monomer such as 4-phenoxybenzophenone.

Preferably, the acid is a Lewis acid which functions as a Friedel-Crafts activator. Suitable compounds are aluminium chloride, aluminium bromide, ferric chloride, ferric bromide, antimony pentachloride, titanium tetrachloride, gallium chloride, molybdenum pentachloride and zinc chloride, but preferred compounds are aluminium chloride ($AlCl_3$) or aluminium bromide ($AlBr_3$); or the acid is superacid such as $HF/BF_3$ or a fluoroalkane sulphonic acid, more particularly trifluoromethane sulphonic acid ($CF_3SO_2OH$).

The acid has to fulfil a number of roles in the reaction: i.e. to complex with the acyl group to activate it toward acylating the monomer and of the oligomeric and polymeric intermediates: and to solvate those intermediates and the polymer during the reaction period. Consequently, the molar ratio of acid to monomer is at least 1:1 and is preferably at least 3:1.

When the acid is a Friedel-Crafts activator, a solvent has to be provided. Suitable solvents are aprotic solvents which do not contain strong Lewis base substituents and which are thermally stable in the presence of the Friedel-Crafts activator at the reaction temperatures involved, i.e. up to about 200° C. Preferred solvents are 1,2-dichlorobenzene and 1,2,4-trichlorobenzene.

When the acid is a superacid, the acid itself functions as a solvent.

Typical reaction temperatures are in the range 80° C. to 250° C.

The invention will now be illustrated by reference to the following Examples.

EXAMPLE 1

2,8 dicarbonylchloride dibenzofuran (1.5000 g, $5.12\times10^{-2}$ moles), and dibenzofuran (0.8602 g. $5.12\times10^{-2}$ moles) were dissolved in 25 mls of trifluoromethane sulphonic acid under an atmosphere of nitrogen. When the evolution of HCl gas had subsided, the resulting red/brown solution was heated to 90° C. and stirred at this temperature for 36 hours. The mixture was then cooled to room temperature and allowed to stand for 2 days. The solution was then poured into water producing a pale pink precipitate. The precipitate was purified by refluxing with 2% sodium hydroxide solution, water and finally methanol (filtering between each). The resulting off white powder was dried in a vacuum oven. The product mass 1.87 g (94% yield) had an inherent viscosity of 0.24 $dlg^{-1}$ (0.1% solution in 98% $H_2SO_4$ at 25° C.) and a glass transition temperature (Tg) of 308° C. as shown by differential scanning calorimetry (DSC). No melting point was detected indicating the polymer to be amorphous.

EXAMPLE 2

Dibenzofuran (1.4442 g. $8.6\times10^{-2}$ moles) and 2,8 dicarbonylchloride dibenzofuran (2.5187 g, $8.6\times10^{-2}$ moles) were dissolved in 12.5 mls of trifluoromethane sulphonic acid under an atmosphere of nitrogen. Once the evolution of HCl gas had ceased, the mixture was heated to 90°-100° C. for 8 hours and then cooled to room temperature. A further 12.5 mls of the acid were added to the mixture which was then allowed to stand overnight. 3.58 g of phosphorous pentachloride was added to the solution cautiously (HCl gas evolved) and the resulting mixture stirred until all the solid was in solution. The solution was allowed to stand for 24 hours. The polymer was isolated as in Example 1, mass 3.2 g (97.4% yield), as a white powder. The polymer had an inherent viscosity of 0.3 $dlg^{-1}$ and a Tg of 303.6° C. as shown by DSC. The polymer was amorphous.

EXAMPLE 3

2-dibenzofuran carbonylchloride (2.00 g, $8.64\times10^{-2}$ moles) was dissolved in 10 mls of trifluoromethane sulphonic acid under an atmosphere of dry nitrogen. The mixture was allowed to stand for 4 days and then quenched in water. The product was isolated as described in Example 1. The white powder (mass 1.64 g. 98%) had a Tg of 305.8° C. as shown by differential scanning calorimetry.

EXAMPLE 4

A rocked autoclave glass liner was charged with dibenzofuran (12.60 g, $7.5\times10^{-2}$ moles) aluminium trichloride (30.00 g $22.5\times10^{-2}$ moles) and 1,2,4 trichlorobenzene (75 mls, previously dried over A4 molecular sieve). The liner was placed in the autoclave which was then purged with $N_2$ and then pressurised to 47 bar with carbon dioxide gas. The autoclave was rocked to saturate the solution with carbon dioxide and then heated to 160° C. over a period of 1 hour. The vessel was maintained a this temperature for 4 hours, allowed to cool to room temperature over a period of 16 hours. The polymer was removed from the vessel as a dark brown solid (deposited on the walls of the reaction vessel) and purified by extracting with methanol two times, 2% HCl, water and finally methanol, extractions consisting of refluxing the solid with the extractant for 30 minutes and filtering the solid. The product was isolated as a brown solid, mass 13.54 g (93.4% yield). The polymer had an inherent viscosity of 0.45 $dlg^{-1}$ and a Tg of 303.8° C. as shown by DSC. The polymer was amorphous.

EXAMPLE 5

A powdered sample of polymer prepared according to the method described in Example 4 was dissolved in concentrated sulphuric acid and was examined using $^{13}C$ nmr spectroscopy. The spectrum obtained was consistent with that expected for a polymer having the structure shown below:

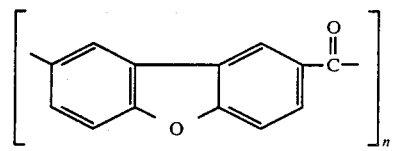

EXAMPLE 6

Dibenzofuran (1.4334 g. $8.53\times10^{-2}$ moles), 2,8 dibenzofuran dicarbonylchloride (2.5000 g, $8.53\times10^{-2}$ moles) and 25 mls of 1,2,4 trichlorobenzene were mixed in a flask, and stirred under a blanket of nitrogen. Aluminium trichloride (2.4 g, $17.2\times10^{-2}$ moles) was added to the mixture which was stirred at room temperature for 3 hours. The mixture was then heated to 150°-160° C. and stirred for a further 3 hours at this temperature. The reaction mixture was cooled and quenched with methanol. The resulting yellow solid was filtered off and purified as in Example 1 producing an off white powder, mass 3.04 g (92% yield). The polymer had an inherent viscosity of 0.29 $dlg^{-1}$ and a Tg of 288° C. as shown by DSC. The polymer was amorphous.

EXAMPLE 7

Using the method described in Example 4, diphenylether (6.375 g, $3.75\times10^{-2}$ moles) and dibenzofuran (6.300 g, $3.75\times10^{-2}$ moles) were reacted with carbon dioxide (51 bar at ambient temperature) in the presence of aluminium chloride (30.00 g, $22.5\times10^{-2}$ moles) and 1,2,4-trichlorobenzene (150 ml), the autoclave being maintained at the reaction temperature for 16 hours. The polymer was isolated as a pale brown solid, 97.9% yield, in accordance with the procedure described in Example 4. The polymer had an inherent viscosity of 0.49 $dlg^{-1}$, a Tg of 229.2° C. and was amorphous.

EXAMPLE 8

Terephthaloyl chloride (4.06 g, $2\times10^{-2}$ moles), dibenzofuran (3.36 g, $2\times10^{-2}$ moles), aluminium chloride (11.0 g, $8\times10^{-2}$ moles) and 1,2,4-trichlorobenzene (50 ml) were added to a 250 ml tubular reaction flask. The contents of the flask were stirred throughout the reaction period. The flask was purged with nitrogen gas and held at 25° C. for 3 hours. The red solution became cloudy and slightly viscous. The flask was then heated in a furnace to 75° C. and held at that temperature for 1½ hours then heated to 125° C. and held at that temperature for 2 hours. After that period, the contents of the flask were a very viscous dark red mixture.

The flask was cooled to ambient temperature and methanol was added to break down the polymer/$AlCl_3$ complex, the polymer being precipitated as a pale yellow solid. The contents of the flask were transferred to a conical flask and heated to reflux for 30 minutes. The solid was then filtered off and refluxed with water and acetone, respectively, for 30 minutes each time. The filtered solid was dried at 120° C. for 6 hours in a vacuum oven and was cream coloured.

The polymer was obtained in an 89.5% yield, had an inherent viscosity of 0.42 dlg$^{-1}$ (measured on a 0.1% solution in concentrated (98%) sulphuric acid at 25° C.) and had a Tg of 225° C. as determined by DSC, the polymer being amorphous.

The polymer was considered to have a structure:

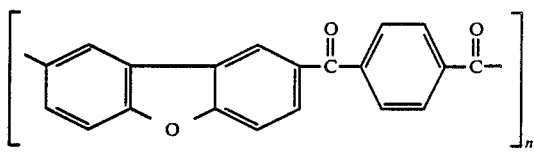

EXAMPLE 9

Powdered samples of polymers, made in accordance with Examples 1 and 4, were each refluxed in dichloromethane for 30 minutes. The samples then were filtered off and dried and checked for weight loss. The weight loss observed for the polymer from Example 1 was 7.2% and the weight loss observed for the polymer from Example 4 was 5.1%.

In comparison, polyethersulphone, which is amorphous, dissolves rapidly in dichloromethane at room temperature.

What is claimed is:

1. An amorphous aromatic polymer comprising a repeating unit of formula I:

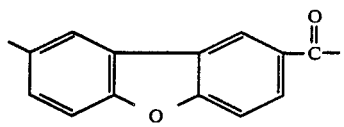

either alone or together with other divalent aromatic repeating units, aromatic moieties which comprise said repeating units in the polymer being connected to one another by linkages selected from a direct link, —O—, —S—, —CO—, —SO$_2$— or —CR$_2$— where R is hydrogen, C$_1$ to C$_4$ alkyl, phenyl or the two groups R, which otherwise may be the same or different, are joined externally to form a cycloaliphatic ring, provided that, when present, the proportion of repeating units containing —SO$_2$— linkages is not more than 20 mole % of the total number of repeating units and that, when present, said aromatic moieties of said other repeating units which are linked to adjacent aromatic moieties by —CO— linkages are not solely comprised by 1,3-phenylene.

2. A polymer according to claim 1, which has a Tg of at least 200° C. and more particularly of at least 250° C.

3. A polymer according to claim 1 or claim 2, which has an inherent viscosity (measured using a 0.1% solution of polymer in 98% H$_2$SO$_4$ at 25° C.) of at least 0.2 dlg$^{-1}$ and more particularly of at least 0.3 dlg$^{-1}$.

4. A polymer according to claim 1, in which, when said other repeating units are present, the mole ratio of repeating unit I to said other units is preferably in the range 10:90 to 90:10, more particularly in the range 40:60 to 90:10.

5. A polymer according to claim 1, which contain at least 50 mole % of repeating unit I.

6. A process for forming an amorphous aromatic polymer comprising a repeating unit of formula I:

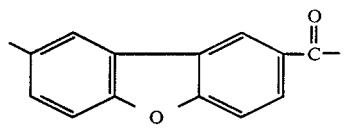

either alone or together with other divalent aromatic repeating units, aromatic moieties which comprise said repeating units in the polymer being connected to one another by linkages selected from a direct link, —O—, —S—, —CO—, —SO$_2$— or —CR$_2$— where R is hydrogen, C$_1$ to C$_4$ alkyl, phenyl or the two groups R (which otherwise may be the same or different) are joined externally to form a cycloaliphatic ring, provided that, when present, the proportion of repeating units containing —SO$_2$— linkages is not more than 20 mole % of the total number of repeating units and that, when present, said aromatic moieties of said other repeating units which are linked to adjacent aromatic moieties by —CO— linkages are not solely comprised by 1,3-phenylene comprises polycondensing at least one aromatic monomer which is susceptible to electrophilic substitution in at least two positions and which includes an aromatic moiety of formula II:

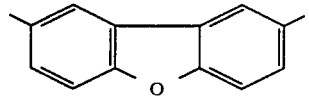

in the presence of an acid capable of activating the condensation reaction.

7. A process according to claim 6, in which the aromatic monomer comprises a compound of formula III:

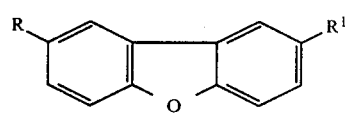

wherein R and R$^1$ are independently —H or —COX where —X is —OH or halide, preferably chloride.

8. A shaped article comprising an amorphous aromatic polymer as defined in claim 1.

* * * * *